United States Patent [19]

Jespersen et al.

[11] 4,409,743

[45] Oct. 18, 1983

[54] PERFORATED WALLS AND DUCT SYSTEM

[76] Inventors: Knud Jespersen, R.R. #1, Terracotta, Ontario; Guy E. Buller-Colthurst, 308 Silverstone Dr., Rexdale, Ontario; Hans L. Bergner, 3199 Folkway Dr., Mississauga, Ontario, all of Canada

[21] Appl. No.: 188,167

[22] Filed: Sep. 17, 1980

Related U.S. Application Data

[63] Continuation of Ser. No. 963,954, Nov. 27, 1978, abandoned.

[51] Int. Cl.³ .............................................. F26B 21/06
[52] U.S. Cl. ........................................ 34/191; 34/195; 34/210; 34/225; 34/233
[58] Field of Search ................... 34/85, 191, 195, 196, 34/197, 198, 199, 200, 210, 212, 213, 214, 215, 218, 225, 233, 240; 98/36; 239/553, 557, 562

[56] References Cited

U.S. PATENT DOCUMENTS

| 424,852 | 4/1890 | Bradley | 239/557 X |
|---|---|---|---|
| 515,625 | 2/1894 | Stott | 239/558 |
| 1,706,993 | 3/1929 | Baker | 34/199 X |
| 1,833,397 | 11/1931 | Hagen | 34/225 |
| 1,954,239 | 4/1934 | Doherty | 34/225 X |
| 2,985,381 | 5/1961 | Cadella | 239/562 X |
| 3,123,988 | 3/1964 | Richman | 98/36 X |
| 3,205,933 | 9/1965 | Morris | 239/562 |
| 3,261,650 | 7/1966 | Stromquist | 34/225 |
| 3,351,025 | 11/1967 | Tillander et al. | 34/210 X |
| 3,859,900 | 1/1975 | Fordsmand | 98/36 |
| 3,893,457 | 7/1975 | Van Der Waalj | 98/36 X |
| 3,893,831 | 7/1975 | Doane | 126/299 EX |

FOREIGN PATENT DOCUMENTS

| 2356736 | 5/1975 | Fed. Rep. of Germany | 34/210 |
|---|---|---|---|
| 497128 | 11/1919 | France | 239/557 |
| 993971 | 11/1951 | France | 34/225 |

*Primary Examiner*—Albert J. Makay
*Assistant Examiner*—Harold Joyce

[57] ABSTRACT

Apparatus for processing meat products in a controlled environment, in which chambers are arranged in pairs, side by side with one another, and defined by outside walls, and a common median wall, with meat support means arranged on facing surfaces of the walls and having air ducts provided in the walls and openings provided over the extent of the inside surfaces of the walls whereby air may flow from side to side across the chambers and air supply ducts connected to distribution ducts in the walls, and a fan for forcing air therearound, and means whereby flow through the various ducts may be reversed at periodic intervals so that air flow will take place across the chambers in opposite directions, reversing at predetermined intervals during the treatment.

Also disclosed is a wall structure for such chambers in which the walls are divided up into a plurality of separate zones, at least some zones being provided with separate branch air ducts, and air connector ducts connected with the branch ducts, and with the other zones, all of which are so controlled, i.e. by dampers, that air flow volumes are substantially equalized over the entire extent of each wall surface.

17 Claims, 12 Drawing Figures

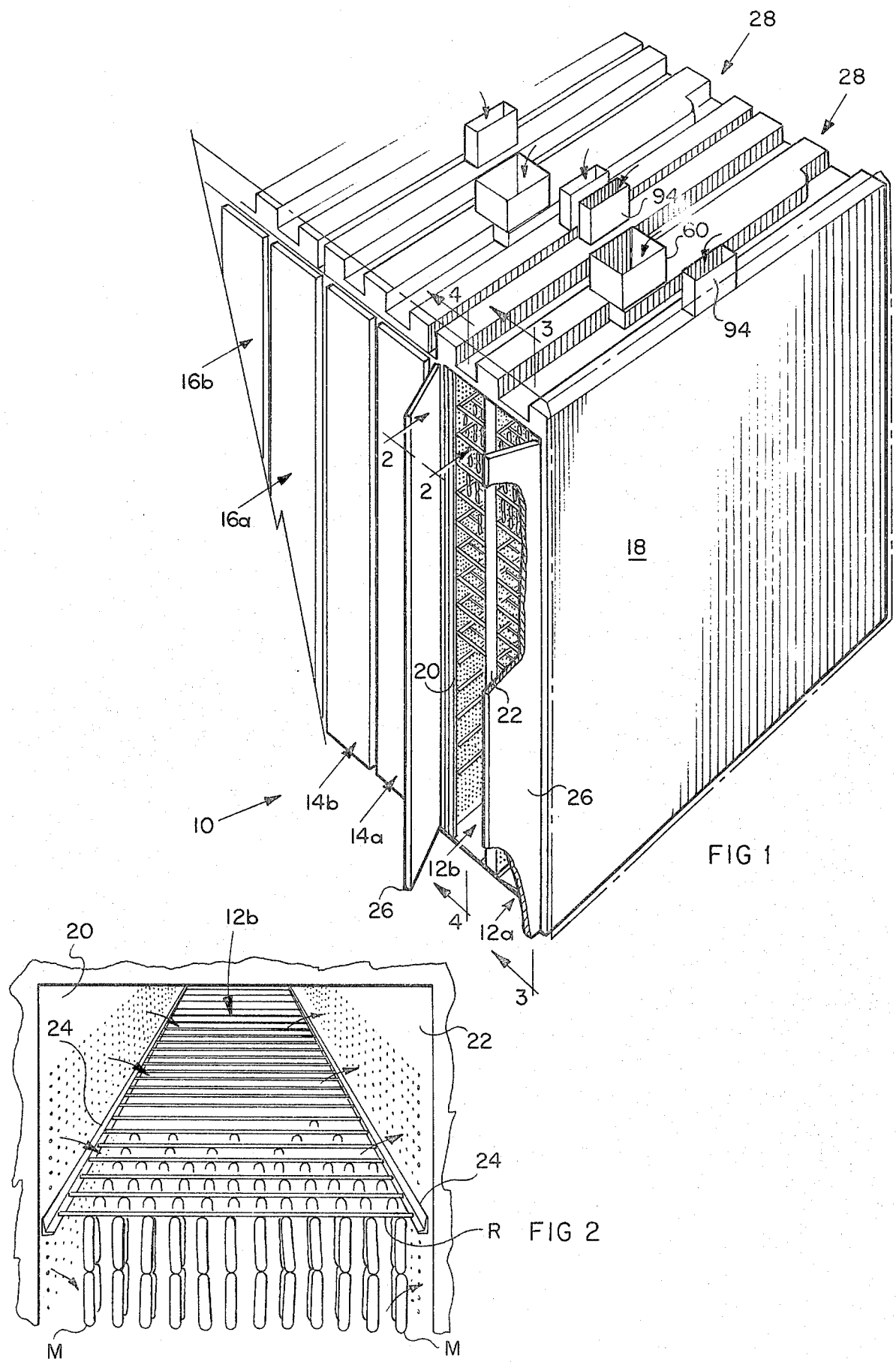

PERFORATED WALLS AND DUCT SYSTEM

This is a continuation of application Ser. No. 963,954 filed Nov. 27, 1978, now abandoned.

BACKGROUND OF THE INVENTION

The processing of various kinds of meat products is carried out in closed chambers, small rooms in fact, under carefully regulated preset conditions. Such processing may involve chilling, curing, drying, smoking with or without partial cooking, and the like.

Processing may be carried out for fairly extended periods, in some cases hours, in other cases a day or more.

It is desirable, during this period, that the air shall not become stagnant, nor be subjected to variation within the chamber. For this purpose a moderate continuous air circulation is provided with the air maintained within the carefully regulated range of preset conditions.

The overall objective is to achieve a carefully regulated treatment of the meat products resulting in a predictable end result.

Where relatively small batches of such products are to be treated, then the maintenance of suitable air circulation in the desired conditions does not present any real problem.

However, when such products are to be mass produced in large volumes, the maintenance of a steady moderate air circulation around all of the product within a given enclosed chamber, at the desired range of conditions becomes more of a problem.

In order to avoid excessive capital costs, it is desirable that the storage or curing rooms or chambers be substantially completely filled with batches of product, and at the same time that the products may be relatively easily placed in and removed from the various chambers as the various batches are progressively treated. In addition to the cost factor, it is also desirable that the dimensions of the chambers be maintained within certain limits, so as to ensure that a regular even air flow takes place throughout the entire chamber.

BRIEF SUMMARY OF THE INVENTION

The invention seeks to overcome the foregoing problems by the provision of chambers arranged in pairs, side by side with one another, and defined by outside walls, and a common median wall, with support means arranged on the inwardly facing surfaces of the outer walls and the median wall, whereby meat products may be suspended on racks throughout substantially the full extent of the chamber. In order to establish satisfactory air flow throughout the entire chamber, air ducts are provided in the outside walls and also in the median wall, and air ways or openings are provided over substantially the entire extent of the inside surfaces of the outer walls and the median wall, whereby air may flow from side to side across the chamber, and air supply ducts are provided outside the chambers, typically on top of the chambers which are connected to the distribution ducts in the walls, and a fan is provided for forcing air therearound, and means are provided whereby flow through the various ducts may be reversed at periodic intervals so that air flow will take place across the chambers in opposite directions, reversing at predetermined intervals during the treatment.

Suitable air treatment systems, such as cooling or heater coils, and humidity control systems which may include humidifiers and/or dehumidifiers and smoke generators may be provided in the system, operated by suitable automatic controls so that a stable range of conditions may be maintained throughout the process.

The invention also comprises the provision of a wall structure for such chambers in which the walls are divided up into a plurality of separate zones, at least some zones being provided with separate branch air ducts, and there being air connector ducts, being connected with the branch ducts, and with the other zones, all of which are so engineered, or controlled, i.e. by dampers and the like, that air flow volumes are substantially equalized over the entire extent of each wall surface.

In accordance with a further advantageous feature of the invention, the air supply ducts and distribution ducts are provided in a compact space saving manner whereby to as far as possible minimize the overall size of the structure.

The invention also comprise a method of processing meat products under controlled environmental conditions, in such chambers.

The various features of novelty which characterize specific objects attained by its use, reference should be had to the accompanying drawings and descriptive matter in which there are illustrated and described preferred embodiments of the invention.

IN THE DRAWINGS

FIG. 1 is an upper perspective illustration showing a bank of chambers in accordance with the invention, with one pair of such chambers shown open, with a door partially cut away for the sake of clarity;

FIG. 2 is a front perspective looking directly into one of the chambers, showing the meat products suspended therein;

DESCRIPTION OF A SPECIFIC EMBODIMENT

Figure 3:
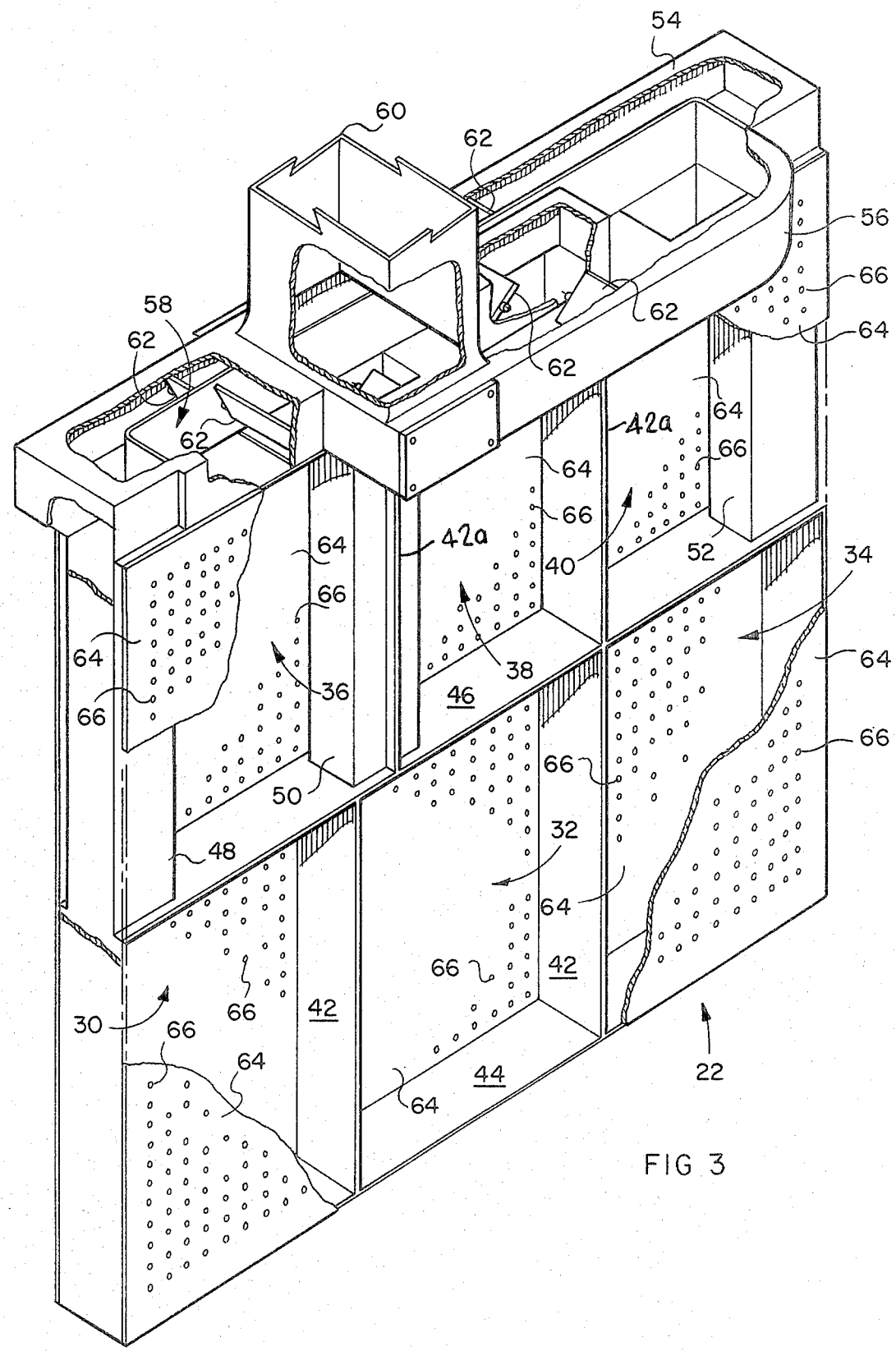
FIG. 3 is a cut away perspective illustration of the median wall between two adjacent chambers.

Referring to FIGS. 1 and 2, the invention is illustrated as comprising a structure indicated generally as 10 which in fact provides pairs of elongated slender vertically disposed chambers 12a, 12b, 14a, 14b, 16a, 16b and so on.

For the purposes of this invention, one such pair of chambers will be described in greater detail, it being understood that the other pairs of chambers will be essentially identical. The purpose of providing a number of such pairs of chambers is to ensure that the process, which is a batch process, ie., must be carried out for a certain bulk quantity of meat products, sufficient to fill one pair of such chambers, can be carried out with different batches of meat products being processed according to different time schedules, so as to regularize production schedules.

Each pair of chambers 12, 14, 16, etc., is provided with outer side walls 18, and 20, and a median wall 22 which is common to each pair of chambers. The chambers 12, 14, 16, etc., will normally be located with their floors at grade level so that meat products may be installed and removed by means of a fork lift truck system which will actually drive right into each chamber.

Within the walls of each chamber 12a, 12b, 14a, 14b, there are provided a series of horizontally arranged support rails 24, on opposite inwardly facing surfaces of the walls 18, 20 and 22 (FIG. 2), so that meat products shown generally as M supported on rods or sticks shown as R, may simply be suspended between the rails 24 for processing.

Doors shown generally as 26 are provided on the front of each of the chambers 12, 14, 16, whereby they may be closed off during processing.

In order to circulate air through the pairs of chambers 12a, 12b, etc., the walls 18, 20 and 22 incorporate duct work (described below) and an air supply and return duct system shown generally as 28 is provided on top of each pair of chambers 12a, 12b, etc., all of which is described in more detail below.

The median wall 22 of each pair of chambers 12, 14, etc., is shown in more detail in FIG. 3 and will be seen to comprise a generally hollow structure made of sheet metal, which is divided into six essentially separate air flow compartments, comprising lower compartments 30, 32 and 34, and upper compartments 36, 38 and 40. The upper and lower compartments are defined by vertical partition walls 42, and 42a and horizontal partition walls 44 and 46.

Air is supplied to, or is returned from the lower compartments 30, 32 and 34 by means of three vertical air ducts 48, 50 and 52, which extend through the upper compartments 36, 38 and 40.

Air is supplied to and is returned from the upper compartments 36, 38 and 40, and also to and from the upper ends of ducts 48, 50 and 52, by means of a system of horizontal upper header ducts. The horizontal header ducts comprise a full length duct 54, and an intermediate length duct 56, and an inner duct 58 between ducts 54 and 56.

All of ducts 54, 56 and 58 are supplied by a common main duct 60, and air flows within the ducts are controlled by means of a system of dampers 62.

Air is supplied to or is returned from main duct 60 by means of any suitable fan system (not shown) which is so arranged that air may be either forced into duct 60 or may be withdrawn from it, and may be changed over at periodic intervals. The details of such fan system are omitted for the sake of clarity.

In addition, any suitable air treatment means may be provided, such as cooling or heating coils (not shown), and a humidifying or dehumidifying system (not shown), or smoke generators (not shown) and suitable automatic controls (not shown).

Fan systems suitable for the purpose suitable coils and other air conditioning or modifying systems are well known in the art and require no further description.

In median wall 22 the opposite sides of the compartments 30, 32, 34, 36, 38 and 40 each comprise flat sheet metal wall panels 64, having a plurality of air openings 66 therethrough by means of which air may either pass from or pass into such compartments, depending upon the direction of air flow.

Preferably, as shown in FIG. 3, the ducts 48, 50 and 52 will be somewhat thinner than the width between such panels 64, so that air flow can take place more or less all over all of such panels 64.

The two side walls 18 and 20 will be seen to be of essentially similar construction, being simply mirror images of one another. Accordingly, only one such side wall, namely side wall 20, is illustrated (see FIG. 4).

It will be seen to comprise three lower air distribution compartments 68, 70 and 72, and two upper air distribution compartments 74, 76.

The lower compartments will be seen to be divided by vertical partition walls 78, and are provided with a lower wall 80, and an intermediate partition wall 82 dividing them from the upper compartments which are divided by vertical partition wall 78a.

Air is supplied to the lower compartments by means of vertical ducts 84, 86 and 88, extending downwardly through the upper compartments 74 and 76.

Air is supplied to the various compartments and ducts by means of horizontal header ducts comprising the full length duct 90, and the intermediate duct 92, both of which are supplied by a common main duct 94. Suitable dampers 93 are provided to regulate air flow as between the various ducts.

Each of main ducts 94 for the two walls 18 and 20 of any pair of chambers, is also connected to the same fan system as is main duct 60 for the intermediate wall 22, so that air may be supplied to for example main duct 60 and withdrawn through main ducts 94 or alternatively may be supplied to both of main ducts 94 and returned through main duct 60.

The inwardly facing surfaces of walls 18 and 20 are provided with wall panels 96 having air flow openings 98 therein, for entry or exiting of air.

The opposite wall panels 100 of the walls 18 and 20 are of course blank, ie., they are not provided with air flow openings, since each pair of chambers 12, 14, etc., is operated independently of the adjacent pairs of air chambers.

Figure 4:
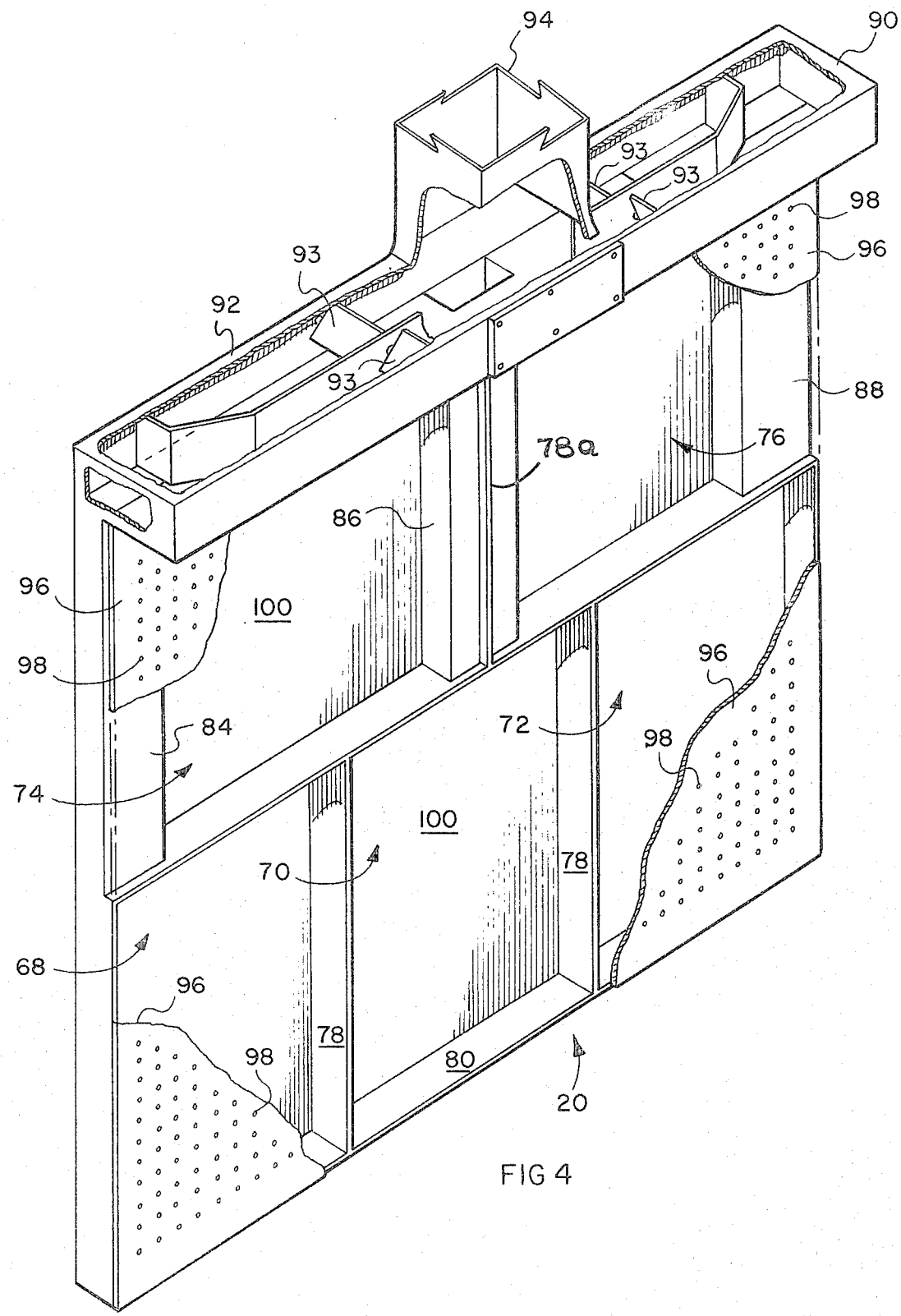
FIG. 4 is a cut away perspective of the left-hand side wall.
Figure 6:
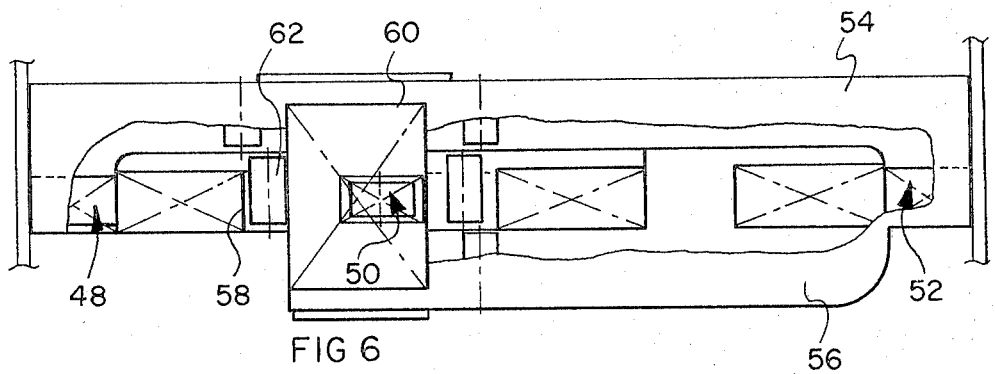
FIG. 6 is a section along the line 6—6 of FIG. 5.
Figure 5:
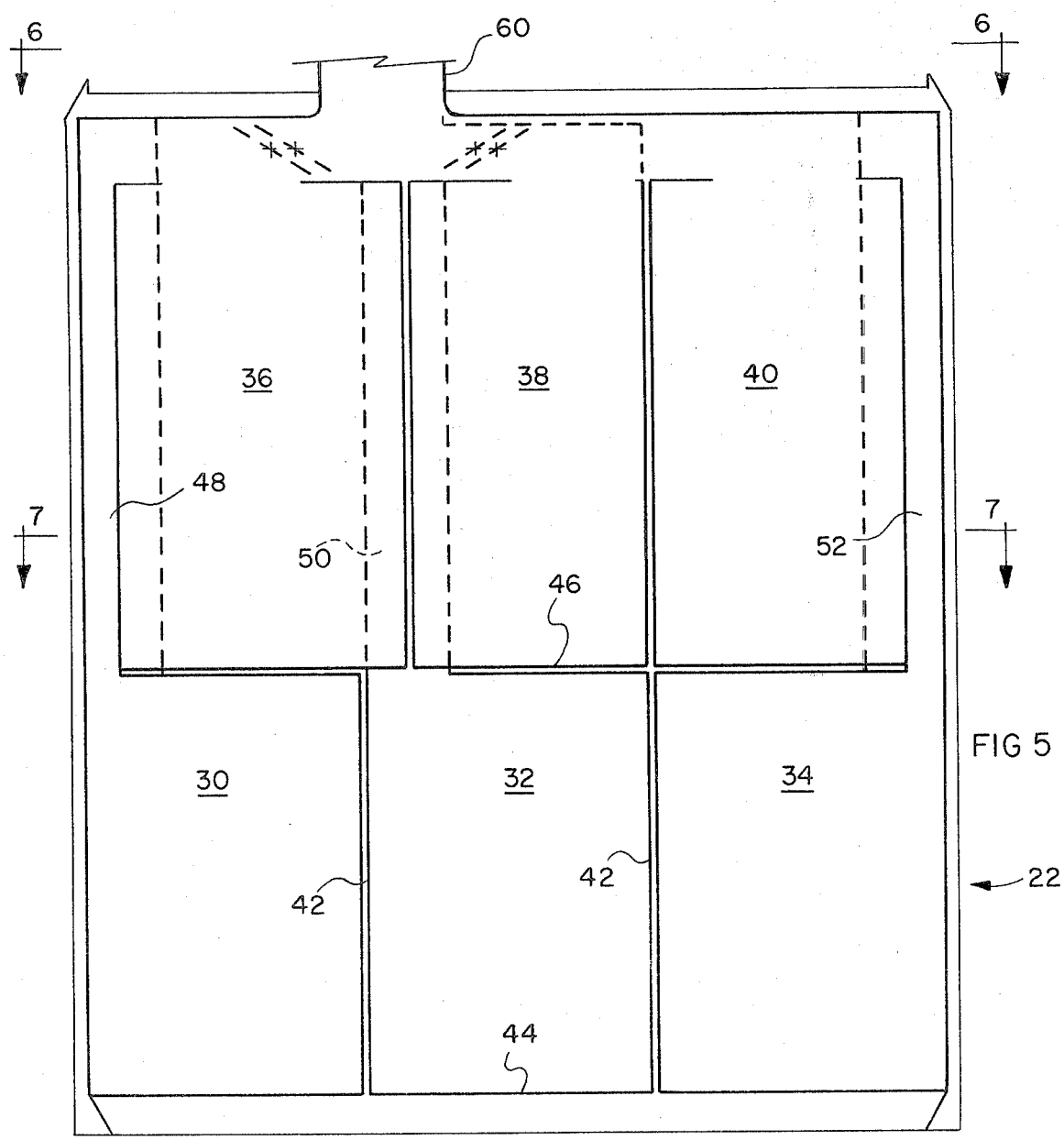
FIG. 5 is a side elevational partly schematic illustration of the median wall.
Figure 7:
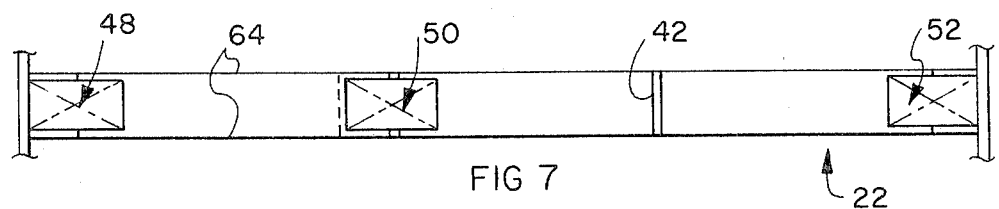
FIG. 7 is a section along the line 7—7 of FIG. 5.
Figure 9:
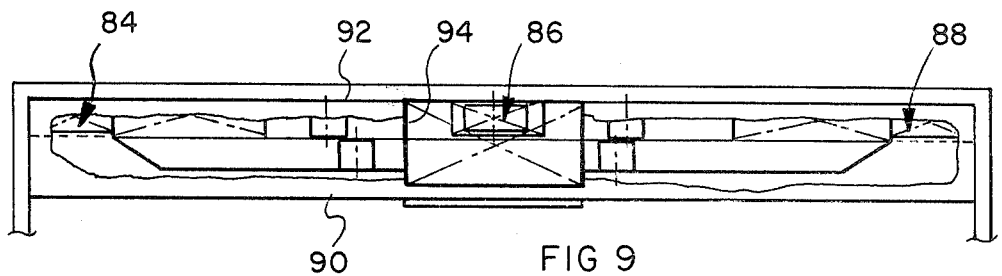
FIG. 9 is a section along the line 9—9 of FIG. 8.
Figure 8:
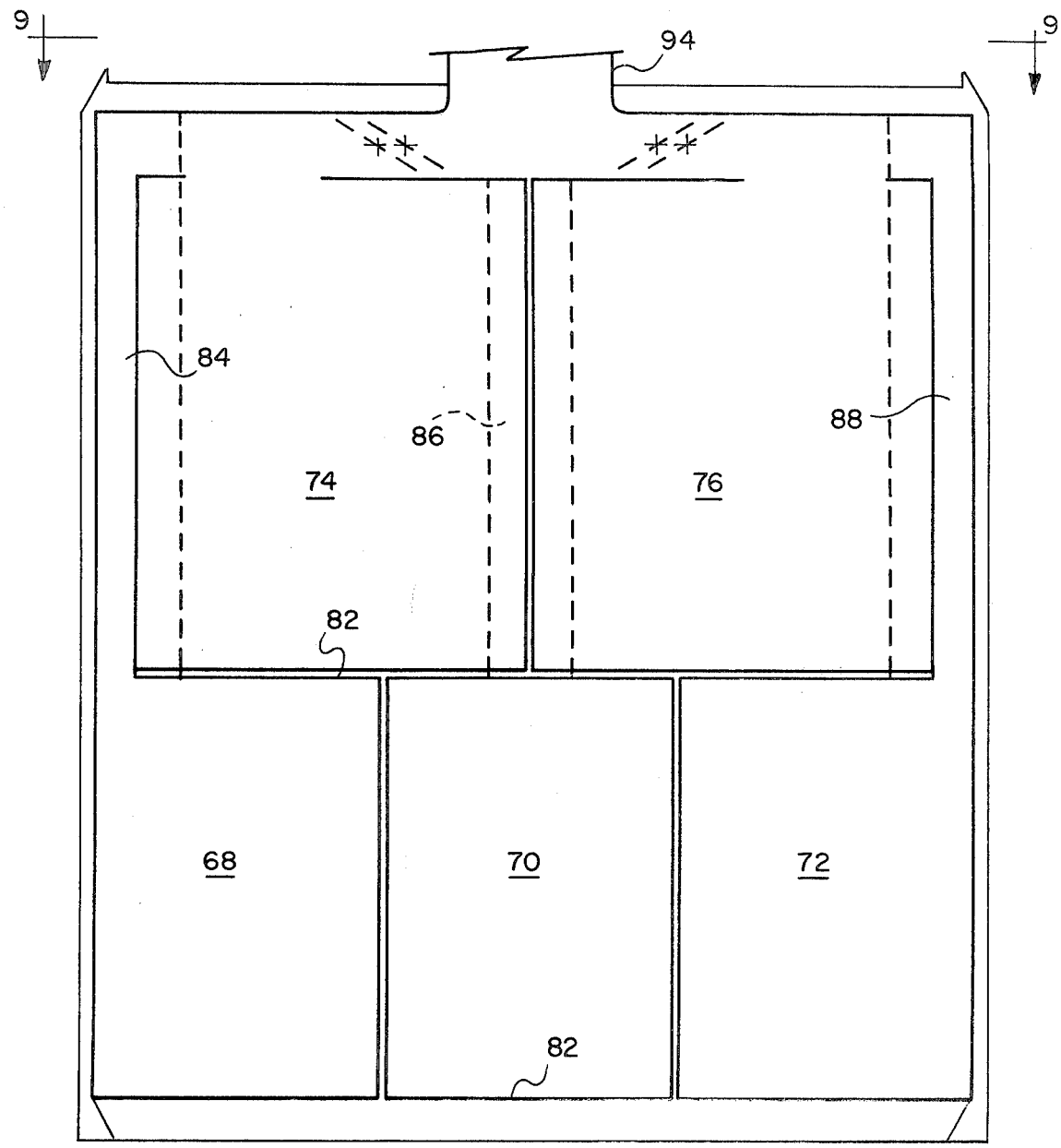
FIG. 8 is a partially schematic side elevational view of the left-hand side wall.
Figure 10:
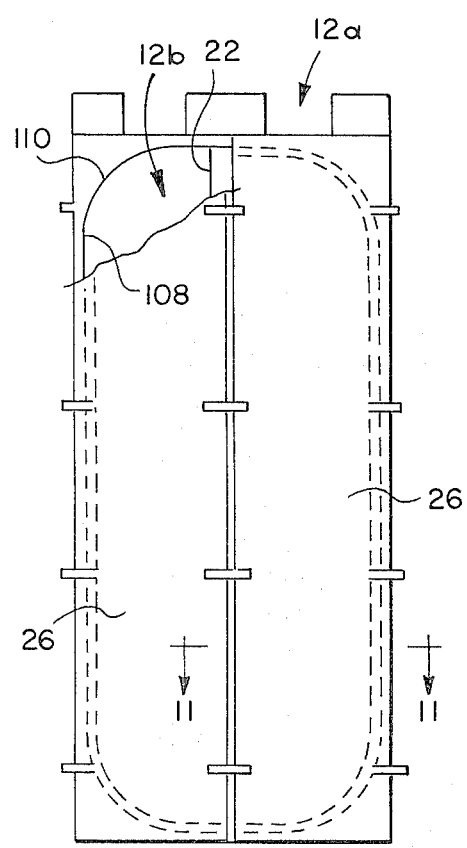
FIG. 10 is a schematic elevation of the doors.

It will be understood that in the illustrations of FIGS. 3 and 4 showing the walls 20 and 22, the supporting rails 24 have been omitted for the sake of clarity.

In order to provide a good air tight seal around the doors, and also to provide a degree of thermal insulation between the interior of the chambers and the exterior, the doors are formed with a hollow closed enclosure indicated generally as 102, formed by channel shaped frame members 104, and inner panel 106. The channel shaped frame members 104 are formed into a generally D shape, the one door 26 simply being a mirror image of the other. In this way the outer corners of the enclosures 102 are formed on a continuous smooth radius.

In addition, the chambers 12a, 12b etc. are provided with forwardly extending sealing surfaces 108, having radiussed corners 110, sealing surfaces 108 being shaped and designed to receive the enclosures 102 of doors 26 therein, with a predetermined substantially regular spacing between channel frames 104 and sealing surfaces 108 continuously therearound.

In order to provide a good air-tight seal in this predetermined gap, a continuous, partially closed channel 112 is provided on the outer surface of the outwardly directed sides of door channel frames 104, such channel 112 defining a open mouth of a reduced width in relation to the main portion of the channel.

Within channel 112 there is provided an inflatable tubular sealing member 114, which is shaped to fit snugly within the channel 112. Sealing member 114 is preferably provided with an extendable sealing surface 116, having a reduced width in relation to the main portion of the sealing member 114.

Sealing member 114 is preferably made of a suitable resilient flexible material such as rubber, or thermo-plastic material having suitable properties, and will essentially be a continuous extrusion. Clearly, such sealing member 114 will be discontinued at the junction between two doors 26, for any one pair of chambers 12, 14 etc.

The tubular member 114 may be inflated with air or a suitable gaseous medium, by means of the flexible hose 118 and a pressure source 120.

Inflation will take place only when the doors 26 are actually closed.

In order to relieve the pressure in the sealing member 114, a pressure relief valve 122 is provided, having a control on 124 which is contacted by the sealing surface 108 of the adjacent chamber. The valve 122 communicates with the interior of the tubular member 114 by means of hose 126.

Valve 122 is so arranged that it is closed, when the doors 26 are closed, but as soon as the doors 26 are opened, the arm 124 is released, thereby opening the valve 122 and permitting the pressure in the tubular member 114 to be released.

If desired, other automatic controls can be provided for controlling the pressure source 120, or alternatively it may also be operated through the action of arm 124, by any suitable electrical or pneumatic circuits (not shown) the details of which are well known to persons skilled in the art.

In order to seal between any two adjacent doors 26, there is provided a sheet metal groove 128, formed by an endwise extension of panel 106, which contains a suitable sealing member 130 which may be made of for example resilient foam sealing material such as foam rubber or foam plastics material.

Figure 11:
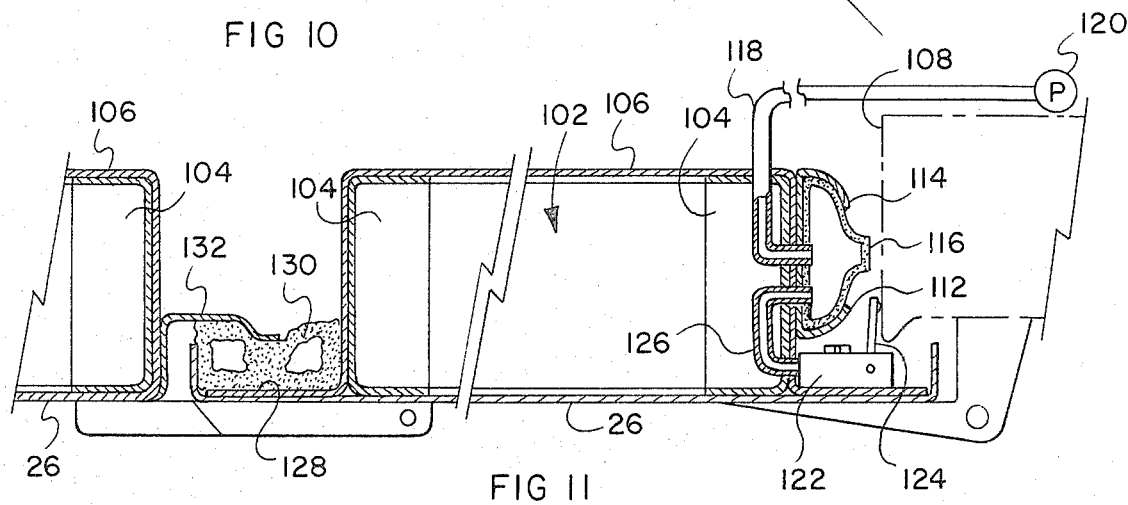
FIG. 11 is a section along line 11—11 of FIG. 10.

On the adjacent door 26 there is provided a sealing tongue 132 which is arranged to press into the sealing member 130 as shown in FIG. 11, when the doors are closed.

The enclosures 102 may be filled with any suitable thermal insulation material (not shown) such as is well known in the art.

In this way, when constructing doors 26, which may be of considerable height, and are made of steel, or stainless steel in a manner in which the tolerances may be relatively imprecise, it is still nevertheless possible to achieve a good air tight seal all around the doors, and also between any pair of doors.

It will of course be appreciated that chambers of this kind, which are used in the meat processing industry, must be cleaned and sterilized regularly between uses.

For this reason, it is desirable that the entire structure shall be capable of being dismantled as far as possible so as to avoid the accumulation of residue within the structure which may give rise to contamination.

Figure 12:
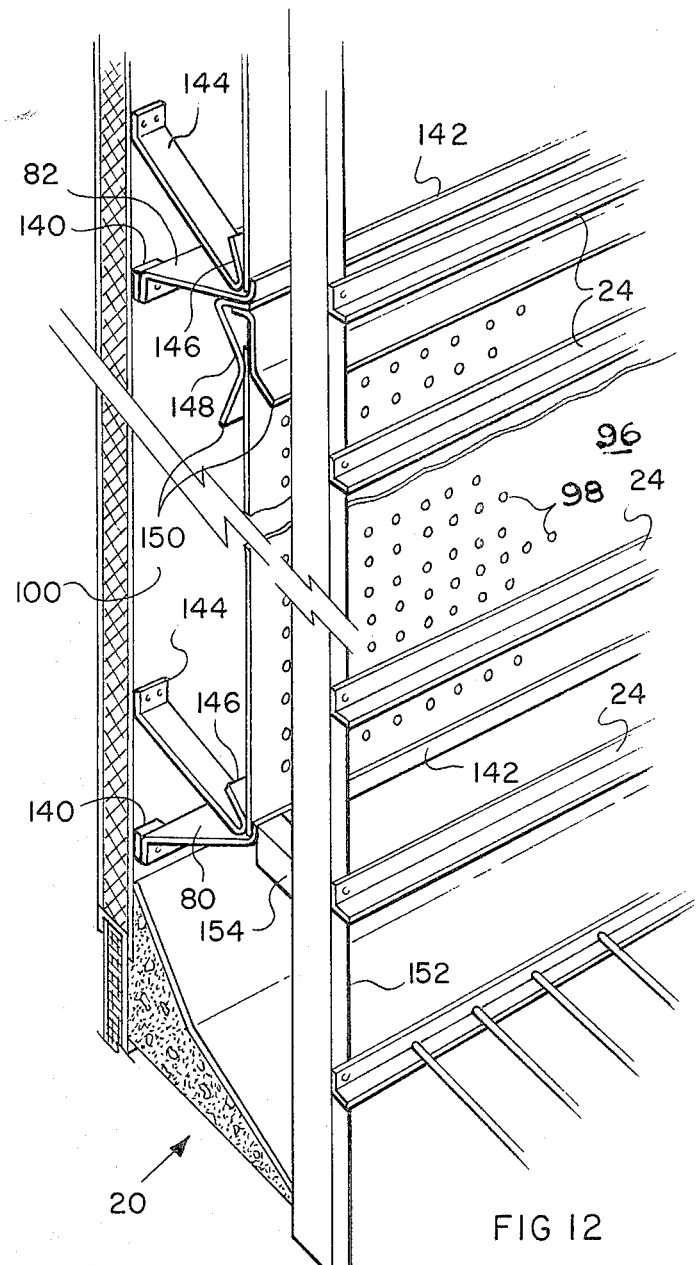
FIG. 12 is a cut away perspective of a detail of the wall construction.

For this purpose, the wall structures, both of the median wall 22 and the side walls 18 and 20, will preferably be made in a dismountable fashion (see FIG. 12).

FIG. 12 illustrates, for the sake of example only, the construction of the side wall 20, in somewhat more detail than is shown in FIG. 4.

It will of course be appreciated that the illustration of FIG. 4 is to reveal the layout of the various chambers, and the manner in which they are connected up with the various ducts.

The illustration of FIG. 12 is merely exemplary of wall 20, and a similar construction is of course applicable to wall 18 and also with minor modifications to median wall 22.

As shown in FIG. 12, the back panel or closed panel 100 is illustrated, corresponding to the panel 100 of FIG. 4.

Various compartments 68, 70, 72, 74 and 76 are all constructed in a dismountable manner as follows.

Extending forwardly from the back panel 100, there are provided two spaced apart horizontal wall members 80 and 82 already referred to. As shown in FIG. 12, there wall members are in fact arranged at a predetermined angle of slope, and are welded on spaced apart abuttments 140, at space intervals, thereby providing a thin slotted gap between back wall 100 and walls 80 and 82.

This slotted opening, together with the predetermined angle of slope, ensures free drainage of washing fluids.

Along the forward edges of horizontal walls 80 and 82 there are provided upturned flanges 142.

Walls 80 and 82 are secured in position by means of spaced apart sheet metal bracers 144, having upturned rearwardly angled flanges 146, the inner ends of braces 144 being welded to back panel 100 as shown.

Extending downwardly from the under surface of the intermediate wall 82, there is provided a generally wedge shaped channel section 148, defining a narrow mouth and an enlarged interior, and having outwardly angled lips 150 for the purposes described below.

The panels 96, provided with perforation 98 for airflow therethrough in either direction, are simply flat sheet metal members, usually of stainless steel or other suitable material, and have a predetermined height somewhat less than the spacing provided in the channels 148.

In this way, they can be readily inserted and removed, by simply pressing the panel 96 or raising it upwardly to the full extent of channel 148, at which point the lower edge of the panel 96 will then be clear of the flange 142 on partition wall 80. Panel 96 can then be swung outwardly, and may be removed. It can be reinserted by simply reversing these movements.

Once the panel 96 is removed, then the enire structure can be readily steam cleaned and dried, and any liquid or detergents used in such cleaning will readily drain from all of the surfaces, and can drain rearwardly off the horizontal partition walls 80 and 82.

Also shown in FIG. 12 in somewhat more detail, is the arrangement of vertical support columns 152, spaced outwardly from the panels 96 by means of spacer bars 154. The vertical support columns 152 carry the horizontal rails or angles 24, on which the rods or sticks R may be supported.

In use, meat products typically sausages, although any other meat products that may be required to be treated under stored conditions, may also be treated in the same way, are supported typically on rods R, in tiers within the various chambers 12, 14 etc. and the doors are closed, and the seals inflated.

Air flow is then commenced across the pairs of chambers 12, 14 etc. For example such air flow may be commenced from the outer side walls 18 and 20, across the chambers 12a and 12b, and into the median wall 22. As such air is circulated in this manner, by suitable air conditioning or air treatment means (not shown) the air may be conditioned in a variety of ways on a continuous basis. The details of such air conditioning apparatus are well known to those skilled in the art and require no further description. Typically it will incorporate one or more fans, and air heating and or cooling coils, and air humidification means. In addition, it may be desirable to incorporate some form of smoke, or artificial smoke known as "liquid smoke", which may be entrained with the air circulating in the chambers, in known manner. After a predetermined processing time, typically one hour, air flow will be reversed by any suitable means (not shown) after which air flow will take place out of median wall 22, outwardly across the two chambers 12a and 12b and back into the side walls 18 and 20.

It will be appreciated that a variety of different structures may be employed for the purposes of reversing the air flow, and the details of which are omitted for the sake of clarity. For the purposes of the present disclosure, all that is required is that the air flow may take place either outwardly from the side walls 18 and 20 and back into the median wall 22, or may take place in the reverse manner, thereby providing for air flow in two different directions, at different periods of time, across the various chambers.

It will also of course be appreciated that if desired, chambers 12 may be loaded on one day and chambers 14 on another day and so on, so that the production of finished meat products may be carried on in a regular daily or other periodical basis.

Having described what is believed to be the best mode by which the invention may be performed, it will be seen that the invention may be particularly defined as follows:

An air flow wall structure for use in the construction of chambers for processing meat products, said wall structure comprising:

a wall of two sided construction defining a hollow interior enclosure between said two sides, a plurality of separate wall panel members forming at least one said side, panel support means releasably supporting said wall panel members, partition means extending between said two sides of said wall dividing said hollow interior into separate compartments, duct means communicating with said compartments, air passages in said wall panel members whereby air may flow from, or into, said compartments, and, damper means in at least some of said duct means for controlling flow of air therein.

The invention further comprises apparatus for processing meat products in a controlled environment and comprising at least two air flow walls defining opposite sides of a chamber, said chamber having a top, a floor, a back and door means, each said wall having generally planar first well panel means of predetermined height and width, corresponding to the interior height and width of the chamber, and having an inner and an outer surface, air passageways formed at spaced intervals all over said first wall panel means, supporting means on the inner surface of said first wall panel means whereby meat products may be supported in said chamber, second wall panel means located in a parallel spaced apart plane relative to said first wall panel means, and defining therewith a hollow interior enclosure, partition members extending between said first and second wall panel means dividing said enclosure therebetween into separate air circulation zones, branch duct means extending between said first and second wall panel means and parallel thereto and connecting with some said air circulation zones and passing through other said air circulation zones without connecting therewith, and first air duct means connecting with said branch duct means in one said wall, and second air duct means connecting with said branch cut means in said other wall.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. An air flow wall for use in the construction of chambers for processing meat products, said wall comprising;

generally planar first wall panel means of predetermined height and width, corresponding to the interior height and width of the chamber, and having an inner and an outer surface;
air passageways formed at spaced intervals all over said first wall panel means;
supporting means on the inner surface of said first wall panel means whereby meat products may be supported in said chamber;
second wall panel means located in a parallel spaced apart plane relative to said first wall panel means, and defining therewith a hollow interior enclosure;
partition members extending between said first and second wall panels means dividing said enclosure therebetween into separate air circulation zones;
branch duct means extending between said first and second wall panel means and parallel thereto and connecting with some said air circulation zones and passing through other said air circulation zones without connecting therewith;
connector duct means connecting both with said branch duct means and with said other said air circulation zones whereby air may flow between all said air circulation zones and said connector duct means simultaneous.

2. An air flow wall as claimed in claim 1 including at least one horizontal and at least one vertical partition member, intersecting one another, and defining at least two upper zones and two lower zones.

3. An air flow wall as claimed in claim 2 wherein said connector duct means extends along the upper edge of said upper zone, and wherein said branch duct means extend from said connector duct means downwardly through said upper zone, and connect with said lower zones through said horizontal partition member.

4. An air flow wall as claimed in claim 3 wherein said branch duct means have a width narrower than the spacing between said first wall panel and said second wall panel, whereby air may circulate within said upper zones, around at least said branch duct means between said branch duct means and said first and second wall panels.

5. An air flow structure as claimed in claim 1 wherein said partition members comprise at least some partition walls disposed at an angle between vertical and horizontal, whereby to facilitate water flow therefrom for cleansing.

6. An air flow wall as claimed in claim 1 including wall panel support means for at least one of said first and second wall panel means, and wherein said at least one of said first and second wall panel means is releasably supported on said support means, whereby the same may be removed for cleansing of the spacing between said first and second wall panel means.

7. An air flow well as claimed in claim 6 wherein said partition members include at least some said partition members disposed at an angle between vertical and horizontal, whereby to facilitate water flow therefrom during cleansing, there being a water flow passageway between a lower portion of said angled partition members, and an adjacent one of said first and second wall panel means, whereby to permit water flow therebetween.

8. An air flow wall as claimed in claim 7 wherein said wall panel support means comprise for each said releaseable panel, an upper, downwardly directed panel receiving channel member, and a lower upwardly directed channel supporting flange, said panel member being releasably supported between the same as aforesaid.

9. An air flow wall as claimed in claim 8 including at least some partition members arranged along a generally horizontal axis, and being tilted relative to the horizontal about an axis normal to said horizontal axis, and wherein said upper panel supporting channels are located on an underside of said wall means, and wherein said lower panel supporting flanges are located on an upper portion of said partition means, for supporting respective lower and upper wall panels.

10. An air flow wall structure for use in the construction of chambers for processing meat products, said wall structure comprising:
a wall having two generally vertical sides defining a hollow interior enclosure between said two sides;
a plurality of removable separate generally vertical wall panel members forming a said side of said wall and being separable from the other said side of said wall;
a plurality of separate upper and lower panel support means mounted at spaced locations within such hollow interior of such wall for engaging upper and lower panel edges and for releasably supporting respective said wall panel members in position in said wall whereby one said panel member may be removed without disturbing another such panel member;
partition means extending between said two sides of said wall dividing said hollow interior into separate compartments;
duct means communicating with said compartments;
air passages in said wall panel members whereby air may flow from, or into, said compartments; and
damper means in at least some of said duct means for controlling flow of air therein.

11. An air flow wall structure as claimed in claim 10 wherein said partition means comprise horizontal and vertical partitions intersecting one another, and extending across said hollow interior from one said side to the other said side.

12. Apparatus for processing meat products in a controlled environment and comprising;
at least two air flow walls defining opposite sides of a chamber, said chamber having a top, a floor, a back and door means, each said wall having
generally planar first wall panel means of predetermined height and width, corresponding to the interior height and width of the chamber, and having an inner and an outer surface;
air passageways formed at spaced intervals all over said first wall panel means;
supporting means on the inner surface of said first wall panel means whereby meat products may be supported in said chamber;
second wall panel means located in a parallel spaced apart plane relative to said first wall panel means, and defining therewith a hollow interior enclosure;
partition members extending between said first and second wall panel means dividing said enclosure therebetween into separate air circulation zone;
branch duct means extending between said first and second wall panel means and parallel thereto and connecting with some said air circulation zones and passing through other said air circulation zones without connecting therewith, and,
first air duct means connecting with said branch duct means in one said wall, and second air duct means connecting with said branch duct means in said other wall, 13. Apparatus for processing meat products as claimed in claim 12 including a pair of doors for each said chamber, and including sealing means disposed on one of said doors and inter-engageable with the other of said doors in said pair for forming a good air-tight seal therebetween.

14. Apparatus as claimed in claim 12 including power operated means for selectively supplying air to one of said first and second duct means, and removing air from the other.

15. Apparatus for processing meat products as claimed in claim 14, including a second said chamber, said chambers forming a pair, and wherein a first one of said walls is an outside wall of a first chamber, and a second one of said walls is a median wall between said pair of chambers, and including a third said wall forming the outside wall of the second said chamber, both said chambers having a top, a floor, a back and door means.

16. Apparatus for processing meat products as claimed in claim 15 including air flow openings on both sides of said second wall, whereby air may flow from said second wall into both said chambers or from both said chambers into said second wall, and wherein said third wall includes air flow openings, whereby air may flow therefrom into said second chamber or may flow therefrom into said second chamber or may flow from said second chamber into said third wall.

17. Apparatus for processing meat products as claimed in claim 16 including third air duct means connecting with said third wall, and connected with said power operated means in conjunction with said first air duct means, whereby said power operated means is operable to supply air both to said first and third duct means, while removing air from said second duct means, and is selectively operable to supply air to said second duct means and remove air from said first and third duct means, whereby air may be caused to flow from the first and third wall means of respective said chambers, and be removed from said second wall means, or may be caused to flow from said second wall means and be removed from said first and third wall means.

* * * * *